United States Patent [19]

Mourot et al.

[11] Patent Number: 5,533,047
[45] Date of Patent: Jul. 2, 1996

[54] THRESHOLD DETECTOR FOR DIGITAL RADIO TRANSMISSION SYSTEMS, DEVICES COMPRISING A THRESHOLD DETECTOR OF THIS KIND AND CORRESPONDING UTILIZATION

[75] Inventors: Christophe Mourot, Asnieres; René Olivier, St Germain De La Grange; Evelyne Le Strat, Paris, all of France

[73] Assignee: Alcatel Mobile Communication France, Paris, France

[21] Appl. No.: 303,772

[22] Filed: Sep. 9, 1994

[30] Foreign Application Priority Data

Sep. 15, 1993 [FR] France .................................. 93 11007

[51] Int. Cl.[6] .......................... H04B 15/00; H04K 1/00; H04L 27/30
[52] U.S. Cl. ........................ 375/208; 375/317; 375/340; 375/367; 370/18
[58] Field of Search ...................................... 375/200, 205, 375/206, 208, 340, 341, 367, 368, 317, 343; 370/18

[56] References Cited

U.S. PATENT DOCUMENTS

| | | | |
|---|---|---|---|
| 5,151,926 | 9/1992 | Chennakeshu et al. | 375/333 |
| 5,251,233 | 10/1993 | Labedz et al. | 375/341 |
| 5,272,446 | 12/1993 | Chalmers et al. | 375/329 |
| 5,432,821 | 7/1995 | Polydoros et al. | 375/340 |

FOREIGN PATENT DOCUMENTS 2214034A  8/1989  United Kingdom .

OTHER PUBLICATIONS

Cahn, "Performance of Digital Matched Filter Correlator with Unknown Interference", *IEEE Transactions On Communication Technology*, vol. Com–19, No. 6 Dec. 1971, pp. 1163–1172.

*Primary Examiner*—Stephen Chin
*Assistant Examiner*—Don Vo
*Attorney, Agent, or Firm*—Sughrue, Mion, Zinn, Macpeak & Seas

[57] ABSTRACT

A threshold detector for digital signal transmission systems using a transmission channel, in particular for transmission to mobiles, calculates a set of coefficients $f_n$ belonging to the group comprising a set of coefficients $c_n$ of the correlation between a first series of digital samples $x_n$ received by the receiver and a second series of reference digital samples $p_n$ known to the receiver, in order to acquire synchronization of the system, and a set of coefficients $\hat{h}_n$ of an estimate of the impulse response of the transmission channel, when the system is already synchronized. It also calculates a decision variable A such that:

$$A = \frac{\sum_{n=0}^{L-1} |f_n|^2}{\frac{1}{N} \sum_{n=0}^{N-1} |x_n|^2}$$

where L and N are predetermined integers. The device has many applications in mobile radio systems, for example for acquisition of synchronization in DS-CDMA systems or for optimizing the transmission channel estimate.

8 Claims, 1 Drawing Sheet

THRESHOLD DETECTOR FOR DIGITAL RADIO TRANSMISSION SYSTEMS, DEVICES COMPRISING A THRESHOLD DETECTOR OF THIS KIND AND CORRESPONDING UTILIZATION

BACKGROUND OF THE INVENTION

1. Field of the Invention

The field of the invention is that of digital transmission, in particular to mobiles. To be more precise, the invention concerns a threshold detector for digital transmission system receivers.

2. Description of the Prior Art

There are essentially three types of multiple access digital transmission systems: FDMA, TDMA, CDMA.

Frequency division multiple access (FDMA) was the first system to be used. It entails separating calls to be transmitted by allocating each call a specific frequency band which can easily be separated from others by filtering at the receiver.

This system is little used nowadays because it requires a receiver for each transmission channel used, so that a central station must have a large number of receivers to enable simultaneous: conversation with a large number of distributed stations.

Time-division multiple access (TDMA) is a system which entails time-sharing all of the transmission channel: to prevent information overlapping only one station transmits at a time and, when it transmits, it uses all of the channel.

TDMA systems pose difficult equalization problems if the transmission channel is disturbed by echoes or by jamming.

Finally, the code division multiple access system (CDMA) uses spread spectrum techniques.

One spectrum spreading technique, known as direct sequence spectrum spreading, entails transmitting a signal $s(t)$ obtained by multiplying a digital data signal $d(t)$ by a spreading code $g(t)$. The signal $d(t)$ is characterized by its bit frequency. The spreading code $g(t)$ is a pseudo-random signal characterized by its chip frequency, which is greater than the bit frequency by a known factor $G$ which is called the spreading gain or the band expansion factor. The following equations apply:

data signal $d(t)$:

$$d(t) = \sum_{k=-\infty}^{k=+\infty} d_n \delta(t - kT_b)$$

spreading code $g(t)$:

$$g(t) = \sum_{k=-\infty}^{k=+\infty} g_n \delta(t - k_c)$$

signal to transmit $s(t)$:

$$s(t) = \sum_{k=-\infty}^{k=+\infty} d\left[\frac{k}{G}\right] g_n \delta(t - kT_c)$$

where:

$T_b$ is the reciprocal of the bit frequency;

$T_c$ is the reciprocal of the chip frequency;

[] is the integer part.

Decoding at the receiver is effected by combining the signal received with a local replica of $g(t)$ synchronized to the transmission. One prior art device of this type is known to those skilled in the art as a "rake receiver".

Threshold detectors are used in several of these systems, in many applications. One instance is for acquisition of synchronization in DS-CDMA (direct sequence CDMA) systems, and another is for optimization of the estimated impulse response of the transmission channel in TDMA and CDMA systems.

Generally speaking, prior art type threshold detectors calculate the correlation between a transmitted data series and a reference data series and then compare the result of this correlation with a predetermined threshold.

The major drawback of these detectors is that the predetermined threshold is fixed, once and for all, whereas the correlation result cannot be analyzed reliably without an instantaneous knowledge of the signal propagation conditions.

Thus, in the case of synchronizing a CDMA system, the correlation result comprises a wanted part, corresponding to a given propagation path length, and an unwanted part corresponding to the additive noise on the channel and to the other propagation path lengths of the channel.

It is therefore maximum when the maximum propagation path length has been detected. It is therefore necessary to choose a threshold such that the decision variable is above the threshold for the maximum propagation path length. However, setting this threshold requires a knowledge of the maximum propagation path length. This is a random variable whose instantaneous values are not known, only its statistical probability being known.

The threshold used is therefore generally a compromise, leading to two types of error. Either it is too low (at a given time) and generates false alarms (threshold exceeded although synchronization has not been acquired), or it is too high and does not detect situations which are in fact acceptable.

Thresholds are also used in many other fields which presume a known signal to noise ratio. This is the case in channel estimate optimizing systems, for example, such as those described in French patent application no 92 11886. This cannot be known in advance.

An object of the invention is to overcome the drawbacks of the prior art.

To be more precise, an object of the invention is to provide a threshold detector which is not affected by variations on the transmission channel of a digital transmission system.

In other words, an object of the invention is to provide a threshold detector which is independent of the signal to noise ratio.

Another object of the invention is to provide a threshold detector which, in the case of multipath signal propagation, makes positive use of the different propagation path lengths.

A specific object of the invention is to provide a synchronization device for a direct sequence code distribution multiple access spread spectrum system using a decision threshold independent of the signal to noise ratio.

Another specific object off the invention is to provide a device for optimizing an estimate of the impulse response of the transmission channel allowing for the value of the signal to noise ratio.

Another object of the invention is to provide a device for estimating the value of the signal to noise ratio.

SUMMARY OF THE INVENTION

These objects and others that emerge below are achieved in accordance with the invention by a threshold detector for digital signal transmission systems using a transmission channel, in particular for transmission to mobiles, comprising means for calculating a set of coefficients $f_n$, said set of coefficients $f_n$ belonging to the group comprising a set of coefficients $c_n$ of the correlation between a first series of digital samples $x_n$ received by said receiver and a second series of reference digital samples $p_n$ known to said receiver, in order to acquire synchronization of the system, and a set of coefficients $\hat{h}_n$ of an estimate of the impulse response of said transmission channel, when said system is already synchronized, which detector comprises means for calculating a decision variable A such that:

$$A = \frac{\sum_{n=0}^{L-1} |f_n|^2}{\frac{1}{N} \sum_{n=0}^{N-1} |x_n|^2}$$

where L and N are predetermined integers.

This new decision variable can function reliably over a predefined acceptable range of signal to noise ratios, without knowing the instantaneous value of this ratio.

L is preferably a value representative of the length of said transmission channel.

N is advantageously a value greater than or equal to at least one of the following:
the length of said first and second series of samples;
a value representative of the rate of variation of said transmission channel;
the length of a data burst;
the spreading factor or bandwidth expansion factor of a direct sequence code division multiple access signal.

In an application to acquisition of synchronization in a DS-CDMA system the detector advantageously comprises means for comparing said decision variable A to a predetermined threshold T to supply a decision on the basis of said comparison, said predetermined threshold T being equal to:

$$T = \frac{1}{1 + \frac{1}{(S/N)_{min}}}$$

where $(S/N)_{min}$ is the minimum signal to noise ratio defining the range of operation $[(S/N)_{min}, +\infty[$ of said transmission channel.

In a second preferred embodiment of the invention, also applied to optimizing the transmission channel estimate obtained previously by correlation or any other prior art method, A is compared to one or more thresholds in order to adapt the correction to be applied. The same approach can be used to control activation of an equalizer in TDMA systems or of the rake receiver in DS-CDMA systems or to control the power.

Apart from a threshold detector as such, the invention also concerns the synchronization acquisition devices of a direct sequence code division multiple access spread spectrum signal receiver comprising a threshold detector of this kind and supplying a synchronization locking indication, and devices for estimating the impulse response of a transmission channel, calculating a set of coefficients $\hat{h}_n$ of a channel estimate comprising this threshold detector and means for correcting said set of coefficients allowing for the value of said decision variable.

The invention further concerns a device for estimating the signal to noise ratio of a transmission channel comprising a threshold detector of this kind and means for calculating an estimate of said signal to noise ratio by calculating the value:

$$\frac{\hat{S}}{N\text{(dB)}} = 10 \log \frac{A}{1-A}$$

This signal to noise ratio estimator device can be used in any of the following applications:
equalizer activation control;
decision weighting in an equalizer for a time division multiple access signal;
control of activation of despreading means of a code division multiple access signal;
signal transmit power control.

Other features and advantages of the invention will emerge from the following description of a preferred embodiment of the invention given by way of non-limiting illustrative example only and with reference to the appended drawings.

DETAILED DESCRIPTION OF THE PREFERRED EMBODIMENT

Before describing the invention in detail, a mathematical analysis is given below of the shortcomings of prior art threshold detectors, in the specific instance of synchronizing a DS-CDMA system.

Calculation of the decision variable of the invention is then described, and its validity demonstrated, followed by a description of three preferred applications of the detector of the invention.

The decision variable of the invention is denoted A or V, depending on the example.. Where necessary it carries the time-related subscript n.

1—prior art technique for pilot signal acquisition in a DS-CDMA system

In a direct sequence code division multiple access (DS-CDMA) system the base transceiver station transmits a pilot code continuously. This code is a pseudo-random sequence known to the mobiles.

A mobile which has been powered up starts by generating the pilot code locally and attempts to align this local replica with the pilot code received over the propagation channel. When the locally generated pilot code is aligned correctly the mobile can despread the synchronization channel. The synchronization channel is a channel which sends data useful to the mobile, such as the base clock, its identity, etc; this data is spread by the pilot code.

The mobile can then start to communicate with the base transceiver station. Acquisition of synchronization is the first step in enabling the mobile to access the system.

Previous solutions entail correlating the signal received with a local replica of the pilot code and basing the synchronization locking decision on the correlation result.

In one prior art solution the correlation is calculated for indices running throughout the period of the pilot code and the index producing the strongest correlation coefficient is selected. Synchronization therefore takes a long time. Another prior art solution entails comparing the correlation result with a predetermined threshold T. However, it is impossible to set this threshold without a knowledge of the instantaneous propagation conditions.

At time n a correlation $c_n$ is calculated as follows:

$$c_n = \sum_{i=0}^{L-1} x_{n-i} \cdot p_{n_0-i}$$

where $x_n = x(nT_c)$ for the received signal samples; $p_{n_0}, p_{n_0-1}, p_{n_0-2} \cdots p_{n_0-N+1}$ denote the portion of the pilot code used as a reference;

N is the correlation length, which is equal to the entire period of the sequence, for example, or can be shorter.

Figure 1:
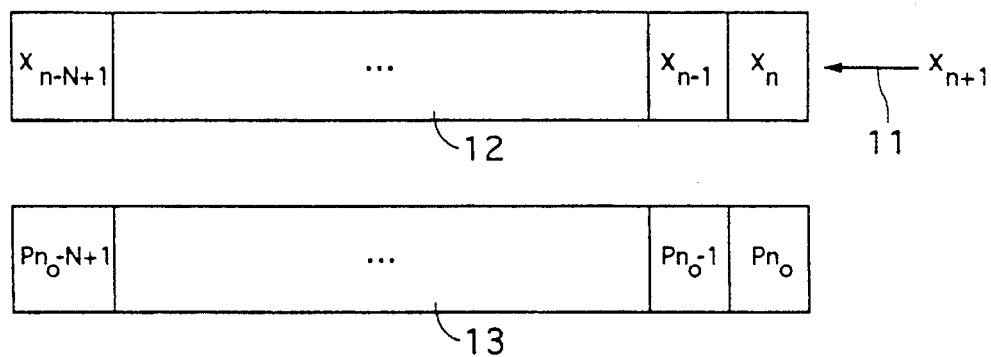
FIG. 1 shows the principle of a prior art correlation calculation method.

As shown in FIG. 1, at each instant a new sample (11) enters a first shift register 12 containing a received signal portion and a new correlation $c_n$ is calculated using data $p_i$ stored in a second register 13.

Considering the coefficients $h_i$ of the impulse response of the channel:

$$c_n = \sum_{k=0}^{L-1} h_k \cdot R_{n-k-n_0} + \frac{1}{N} \sum_{i=0}^{L-1} b(n-i) \cdot p^*(n_0 - i)$$

where $R_{n-n_0}$ is the partial autocorrelation of the pilot code (correlation over N bits):

$$R_{n-n_0} = \frac{1}{N} \sum_{i=0}^{N-1} p(n-i) \cdot p^*(n_0 - i)$$

b(n) are the noise samples.

Assuming ideal autocorrelation:

$R_k = \delta(k, 0) \quad = 1 \quad \text{if } k = 0$
$\quad\quad\quad\quad\quad\quad = 0 \quad \text{otherwise.}$ Hence:

$$c_n = \frac{1}{N} \sum_{i=0}^{N-1} b(n-i) \cdot p^*(n_0 - i)$$

for: $n < n_0$ or $n > n_0 + L - 1$, and $$c_n = h_{n-n_0} + \frac{1}{N} \sum_{i=0}^{N-1} b(n-i) \cdot p^*(n_0 - i)$$

for: $n_0 \leq n \leq n_0 + L$, where the first term represents the wanted part and the second term represents noise.

To minimize the probability of false alarms (threshold exceeded when synchronization is not correct) and of non-detection the requirement is $|c_n|$>threshold, with a maximal | wanted part |/|noise|.

It is therefore necessary to set a threshold T which will be exceeded for $h_{kmax}$ where $k_{max}$ is such that $|h_{kmax}|>|h_i|$ for $i \neq k_{max}$ In this case, the requirement is:

$$c_{n_0} + k_{max} = h_{kmax} + \frac{1}{N} \sum_{i=0}^{N-1} b(n-i) \cdot p^*(n_0 - i)$$

must satisfy the condition: $|c_{n0+kmax}|$>T.

The variable $h_{kmax}$ is entirely random and the instantaneous value $$\frac{|h_{k_{max}}|^2}{\left| \frac{1}{N} \sum_{i=0}^{N-1} b(n-i) \cdot p^*(n_0 - i) \right|^2}$$

cannot be predicted.

The detection threshold cannot be set without a prior knowledge of $h_{kmax}$. If the correlation properties of the pilot code are not optimum, then $$c_{n_0+k_{max}} = h_{k_{max}} + k^1_{k_{max}} \Sigma h_i \cdot R_{n-k-n_0} + \Sigma b(n-i) \cdot p^*(n_0-i)$$

Even prior knowledge of the correlation properties of the pilot does not enable a threshold to be set without a knowledge of the values of $h_i$.

2—Calculation of the decision variable of the invention 2.1—synchronization acquisition $T_c$ represents the duration of a symbol of the signal and $\Delta$ represents the maximum time-delay due to the channel. The maximum number of paths is therefore $L=[\Delta/T_c]+1$, where [x] is the integer part of x.

The complex value of the attenuation due to multipath propagation is $h_k(t)$.

The received signal is:

$$x(t) = \sum_{k=0}^{L-1} h_k(t) \cdot p(t - kT_c) + b(t)$$

where b(t) is noise.

At the receiver, x(t) is sampled at the frequency $1/T_c$, to obtain the samples:

$$x(nT_c) = \sum_{k=0}^{L-1} h_k(nT_c) \cdot p((n-k) \cdot T_c) + b(nT_c)$$

The following simplified form of the equation is used hereinafter:

$$x(n) = \sum_{k=0}^{L-1} h_k(n) \cdot p(n-k) + b(n) \qquad (1)$$

Locking is detected by means of a passive correlator. A portion of length N of the sequence p(n) is chosen and correlated with the received signal. The correlator output is:

$$c_n = \frac{1}{N} \sum_{i=0}^{N-1} x(n-i) \cdot p^*(n_0 - i)$$

where $(p(n_0), \ldots, p(n_0-N+1))$ is the sequence of length N.

Substituting equation (1) for x(n–i):

$$c_n = \frac{1}{N} \sum_{i=0}^{N-1} \left[ \sum_{k=0}^{L-1} h_k(n-i) \cdot p(n-i-k) + b(n-i) \right] \cdot p^*(n_0 - i)$$

i.e. assuming that: $h_k(-i)=h_k$ is constant over the duration of the correlation:

$$c_n = \frac{1}{N} \sum_{k=0}^{L-1} h_k \sum_{i=0}^{N-1} p(n-i-k) \cdot p^*(n_0-i) + \frac{1}{N} \sum_{i=0}^{N-1} b(n-i) \cdot p^*(n_0-i)$$

Considering one cycle of the pseudo-random sequence $p(n)$, the partial correlation $R_{n-n_0}$ is:

$$R_{n-n_0} = \frac{1}{N} \sum_{i=0}^{n-1} p(n-i) \cdot p^*(n_0-i)$$

Thus:

$$c_n = \sum_{i=0}^{N-1} h_k \cdot R_{n-k-n_0} + \frac{1}{N} \sum_{i=0}^{n-1} b(n-i) \cdot p^*(n_0-i)$$

If $n = n_0 + k_0$, where $k_0$ is in the range $\{0, \ldots, L-1\}$, the correlator captures the $k_0$-th path:

$$c_{n_{k_0}} = \sum_{k=0/k \neq k_0}^{L-1} h_k \cdot R_{n_{k_0}-k-n_0} + h_{k_0} \cdot R_{n_{k_0}-k_0-n_0} + \frac{1}{N} \sum_{i=0}^{N-1} b(n_{k_0}-i) \cdot p^*(n_0-i)$$

i.e., with $n_{k0} = n_0 + k_0$:

$$c_{n_0+k_0} = \sum_{k=0/k \neq k_0}^{L-1} h_k \cdot R_{k_0-k} + h_{k_0} \cdot R_0 + \frac{1}{N} \sum_{i=0}^{N-1} b(n_0+k_0-i) \cdot p^*(n_0-i)$$

Consider the ideal case, and assume that:
$p(n)$ and $b(n)$ are independent;
a good estimator for $E(.)$ is:

$$\frac{1}{N} \sum_{i=0}^{N-1} (.)$$

$R_n = \delta_{n,0}$
Thus, if $n$ is not equal to $n_0 + k_0$:

$$c_n = \sum_{k=0}^{L-1} h_k \cdot \delta_{n-k-n_0, 0} + E(b_n \cdot p_n^*)$$

As $n \neq n_0 + k_0$, $n-k-n_0 \neq 0$, and $E(b_n \cdot p_n^*) = E(b_n) \cdot E(p_n^*) = 0$, because $E(p_n^*) = 0$,:

$c_n = 0$  if $n \neq n_0 + k_0$, and
$c_n = h_{k0}$  if $n = n_0 + k_0$.

Summing the $L$ correlation results squared:

$$T_n = \sum_{j=0}^{L-1} |c_{n-j}|^2$$

$T_n$ is maximum for $n = n_0 + L - 1$, and hence:

$$T_{n_0+L-1} = \sum_{k=0}^{L-1} |h_k|^2$$

Consider now the signal energy $x(n)$ estimate:

$$e(n) = \frac{1}{N} \sum_{i=0}^{N-1} |x(n-i)|^2$$

It can be shown that, in the ideal case:

$$e(n) = \sum_{k=0}^{L-1} |h_k|^2 + E(b_n^2)$$

Let $V_n$ denote the detection variable:

$$V_n = \frac{T_n}{e(n)}$$

$V_n$ corresponds to the variable A previously described in the general introduction to the invention. The subscript n is introduced to represent time. Thus: $t = nT_c$. A was not subscripted because it was referenced to time $t=0$, as a generalization and simplification.

In the ideal case:

if $n < n_0$ or $n \geq n_0 + 2L - 1$:  $V_n = 0$
if $n = n_0 + k_l$ where $k_l$ is in the range $\{0, \ldots, L-1\}$:

$$V_n = \frac{\sum_{j=0}^{k_l} |h_j|^2}{\sum_{k=0}^{L-1} |h_k|^2 + E(b_n^2)}$$

if $n = n_0 + L + k_l$ where $k_l$ is part of the set $\{0, \ldots, L-2\}$:

$$V_n = \frac{\sum_{j=k_l+1}^{L-1} |h_j|^2}{\sum_{k=0}^{L-1} |h_k|^2 + E(b_n^2)}$$

$V_n$ is maximum when $n = n_0 + L - 1$:

$$V_{n_0+L-1} = \frac{1}{1 + \frac{E(b_n^2)}{\sum_{k=0}^{L-1} |h_k|^2}}$$

To detect acquisition of synchronization the threshold of $V_n$ is given by $V_{n_0+L-1}$ for a given energy level. For example, to detect acquisition any signal to noise ratio greater than $(SNR)_{min}$, the threshold S will be:

$$S = \frac{1}{1 + \frac{E(b_n^2)}{\sum_{k=0}^{L-1} |h_k|^2}}$$

Note that the energy of the signal with no noise is:

$$A \cdot \sum_{k=0}^{L-1} |h_k|^2$$

so that:

$$S = \frac{1}{1 + \frac{1}{(SNR)_{min}}}$$

A threshold of this kind can detect all situations in which the signal to noise ratio (SNR or S/N) is greater than $SNR_{min}$.

2.2—Systems already synchronized
The first step is to calculate $e(n)$:

$$e(n) = \frac{1}{N} \sum_{i=0}^{N-1} |x_{n-i}|^2$$

where:

$$x_{n-i} = \sum_{l=0}^{L-1} h_l \cdot s_{n-i-l}$$

The symbol transmitted is $s_i$ in this instance, rather than $p_i$, as this is not necessarily a reference sequence, but can be a burst. Thus:

$$e(n) = \sum_{k=0}^{L-1} \sum_{l=0}^{L-1} h_k h_l^* R_{s_{n-k,n-l}} + \frac{1}{N} \sum_{i=0}^{N-1} |b(n-i)|^2 +$$

$$2Re \sum_{k=0}^{L-1} h - k \frac{1}{N} \sum_{i=0}^{N-1} s(n-i-k) \cdot b^*(n-i)$$

where $R_s$ is the correlation of the signal s.

Assuming as previously that:

$R_{s(n-k, n-1)} = \delta_{k,l}$ $e(n)$ is a good estimator of the energy: $e(n)/E(b_n)^2 \sim S/N$:

$$e(n) = \sum_{k=0}^{L-1} |h_n|^2 + E(b_n^2)$$

Assuming that $h_n \approx \hat{h}_n$, it can be deduced that the variable A (or $V_n$) is similar to $1/(1+(S/N)^{-1})$.

3—First use of the decision variable of the invention: synchronization acquisition in a DS-CDMA system In this first application of the invention the synchronization acquisition system is required to operate in the SNR range $[(S/N)_{min}, +\infty[$.

Figure 2:
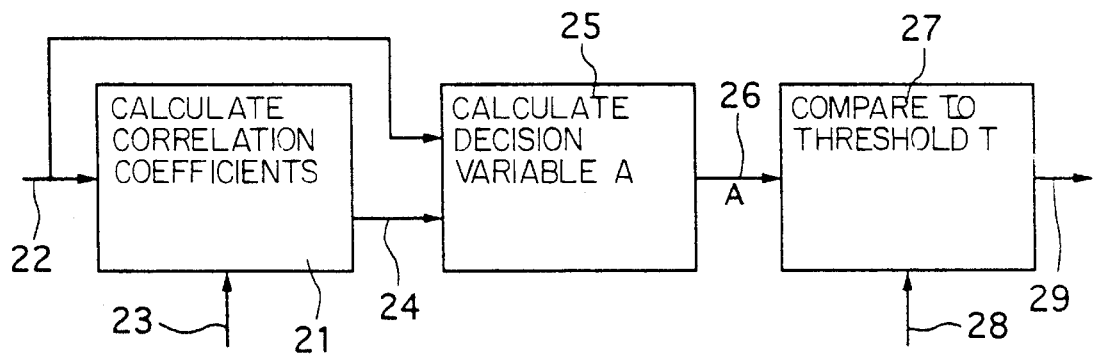
FIG. 2 is a block diagram of a threshold detector of the invention in a first application to synchronization acquisition in a DS-CDMA system.

FIG. 2 is a block diagram of an acquisition device of the invention. It comprises a module 21 for calculating the correlation between a received pilot sequence 22 and a reference pilot sequence 23 stored internally.

At each time n a correlation value $c_n$ is calculated using two registers 12 and 13, as shown in FIG. 1. The register 12 contains the received samples $(x_n)$ and the register 13 contains the reference section $(p_n)$ of the pilot code.

The correlation result 24 ($c_n$) is passed to a module 25 for calculating the value of the decision variable of the invention. This module also receives the received values 22 and calculates at time n:

$$V_n = \frac{\sum_{j=0}^{L-1} |c_{n-j}|^2}{\frac{1}{N} \sum_{j=0}^{N-1} |x_{n-j}|^2}$$

In this equation, $c_{n-j}$ for j=1 through N-1 are the correlation coefficients for previous times.

The following are therefore calculated at each time: $c_n$, $\Sigma |x_{n-j}|^2$ and $V_n$ This value of $V_n$ (26) is passed to a comparator 27 which compares it to a threshold 28 equal to:

$$T = \frac{1}{1 + \frac{1}{(S/N)_{min}}}$$

where $(S/N)_{min}$ is the minimum signal to noise ratio from which the signal is to function.

The comparator 27 delivers a comparison indication 29.

If $V_n < T$, then the values $c_n$ through $c_{n-N+2}$, are retained, the register 12 is advanced by one step and the calculations are repeated. If $V_n \geq T$, then synchronization is deemed to have been acquired.

4—Second use of the decision variable of the invention: optimizing the transmission channel estimate French patent no 92 11886 discloses a device for optimizing the calculated estimate of the impulse response of the channel. The detector of the invention can improve this estimate.

Figure 3:
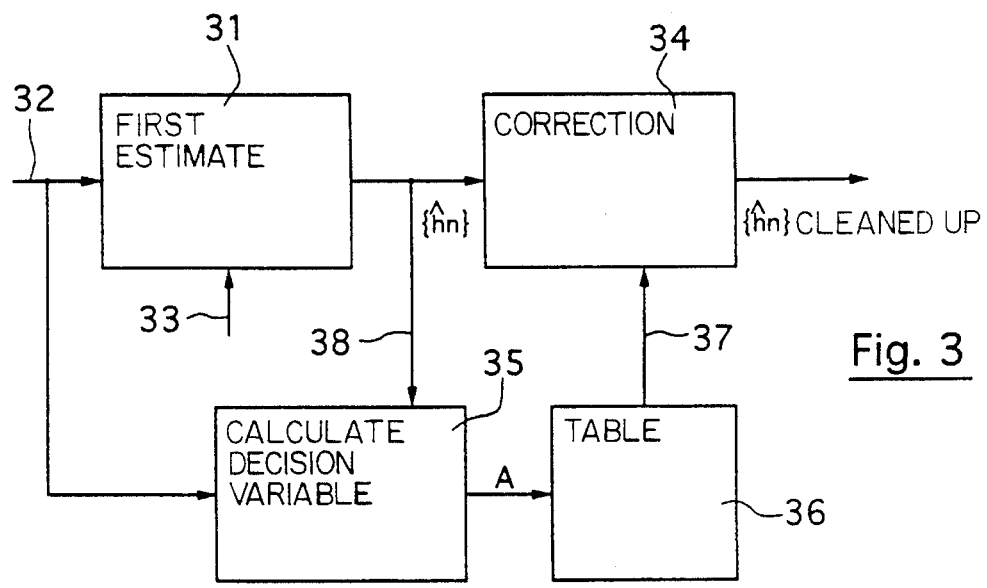
FIG. 3 is a block diagram of a threshold detector of the invention in a second application to optimizing the calculated impulse response of the channel in a CDMA or TDMA system.

The device is shown in FIG. 3. It comprises a module 31 for calculating a first channel estimate, for example by correlation between a received sequence 32 and a reference sequence 33, over a relatively great length in order not to overlook paths separated from the first path by a certain number of symbols. Any other prior art calculation method can of course be used. A correction module 34 then eliminates a number of calculated coefficients, using one or more specific criteria (such as those cited in patent document FR-92 11886), using one or more thresholds.

A module 35 calculates the decision variable A in accordance with the invention from the samples $x_n$ 32 and the coefficients $\{\hat{h}_n\}$ 38 of the estimate supplied by the module 31 and places this variable A in a table 36 which allows adaptation (37) of the correction effected by the module 34 in a manner dependent on this variable and therefore on the signal to noise ratio.

In the prior art technique of patent document FR-9211886, the thresholds used to decide which coefficients to select are fixed and relate to a prior knowledge of the signal to noise ratio. Use of the variable A of the invention avoids the need for prior knowledge of S/N and provides a dynamic criterion for selecting coefficients (34). For example, the module 34 decides on the number of coefficients to be eliminated, and/or the portion of the impulse response to be retained, etc. More generally, A can determine the parameters needed for selection of the coefficients by the module 34.

It has been shown that A is equivalent to $1/(1+(S/N)^{-1})$ when the system is synchronized. Generally speaking, the higher the value A, the better the S/N ratio and consequently the less need to clean up the channel estimate.

The correction 34 can, for example, consist in rejecting a variable number p of coefficients of the impulse response of the increasing energy channel such that the sum of the squares of the moduli of the p coefficients rejected is less than a fraction (C) of the sum (T) of all the squares of the coefficients and such that the sum of the squares of the moduli of the p+1 increasing energy coefficients are greater than CT.

In accordance with the invention the value C 37 is no longer fixed, but depends on A. The table 36 effects the following assignment:

if $A > A_0$ then $C = C_0$ if $A_1 < A < A_0$ then $C = C_1$

...

if $A_{i+1} < A < A_i$ then $C = C_{i+1}$

Where $A_{i+1} < A_i < \ldots < A_0$ and $C_{i+1} < C_i < \ldots < C_0$

The equation $C_i = f(A_i)$ can be simulated. Thus A is calculated and by comparison with $A_i$ the portion C to be retained is deduced.

A can also be used to control the elimination of the coefficients of the impulse response of the channel whose modulus is less than a portion C' of the highest coefficient modulus. It is also possible to eliminate the coefficients of the impulse response whose modulus is less than a given threshold dependent on A. Finally, a given number of coefficients can be eliminated, still dependent on A.

5—Third use of the decision variable of the invention: estimating the signal to noise ratio As already mentioned, when the system is synchronized, the variable A of the invention is similar to $1/(1+(S/N)^{-1})$. It is thus a simple matter to deduce the estimate of the signal to noise ratio as follows:

$$\frac{\hat{S}}{N\text{(dB)}} = 10 \log \frac{A}{1-A}$$

To avoid dividing by zero, A is systematically replaced by a value such as 0.999 if A is equal to 1.

This estimate of the signal to noise ratio finds many applications in the field of digital transmission, such as:

activating an equalizer or a despreading device (rake receiver):
S/N is deduced from A. If S/N is very poor, there is no attempt to equalize a packet in TDMA systems or to despread a signal in CDMA systems (the S/N limits are system dependent).
The estimated symbols are replaced with erasures.
More generally, if A is below a predetermined threshold, a decision can be taken to disconnect the equalizer or the "rake receiver".

the weighting of decisions of an equalizer for decoding a TDMA channel:
Soft decision equalizers such as those using the Viterbi algorithm associate with each equalized block or burst an indication of the reception quality which can be used by the channel decoder. This indication can be the estimated S/N, or A directly.
The usual soft decision calculation mode, as described for example in the article "A Viterbi algorithm with soft decision outputs and its applications", J. Hagenauer, P. Höher; Proceedings of the IEEE Globecom '89, Dallas, 1989, p.47), can be replaced by the association of the value A or S/N with all the bits or symbols of the equalized burst.

power control:
Some TDMA power control systems are based on an estimate of transmission quality, rather than merely on the received power level. In CDMA systems, most power control algorithms are based on an S/N estimate. Once again, S/N can be deduced from A, or the power control algorithms can allow for A directly.

These applications of the invention are naturally given by way of example only and are not limiting on the invention. The threshold detector of the invention can be used in many other fields, as will be evident to the person skilled in the art.

There is claimed:

1. Threshold detector for a digital signal transmission system using a transmission channel, in particular for transmission to mobiles, comprising:
means for calculating a set of coefficients $f_n$ belonging to a group comprising of a set of coefficient $c_n$ expressing a correlation between a first series of digital samples $x_n$ received by a receiver and a second series of reference digital samples $p_n$ know to said receiver, in order to acquire synchronization of the system, and a set of coefficient $\hat{h}_n$ of an estimate of an impulse response of said transmission channel, when said system is already synchronized; and means for calculating a decision variable A such that:

$$A = \frac{\sum_{n=0}^{L-1} |f_n|^2}{\frac{1}{N} \sum_{n=0}^{N-1} |x_n|^2}$$

where L and N are predetermined integers.

2. Threshold detector according to claim 1 wherein L is a value representative of the length of said transmission channel.

3. Threshold detector according to claim 1 wherein N is a value greater than or equal to at least one of the following:
the length of said first and second series of samples;
a value representative of a rate of variation of said transmission channel;
the length of a data burst;
a spreading factor or bandwith expansion factor of a direct sequence code division multiple access signal.

4. Threshold detector according to claim 1 wherein said first series of samples received corresponds to a pilot code of a direct sequence code division multiple access signal, and further comprising means for comparing said decision variable A to a predetermined threshold T supplying a decision indication on the basis of said comparison, said predetermined threshold T being equal to:

$$T = \frac{1}{1 + \frac{1}{(S/N)_{min}}}$$

where $(S/N)_{min}$ is the minimum signal to noise ratio defining the range of operation $((S/N)_{min}, +\infty)$ of said transmission system.

5. Device for acquiring synchronization of a direct sequence code division multiple access spread spectrum signal, comprising:
a threshold detector for a digital signal transmission system using a transmission channel, in particular for transmission to mobiles, said threshold detector comprising means for calculating a set of coefficients $f_n$ belonging to a group comprising a set of coefficients $c_n$ expressing a correlation between a first series of digital samples $x_n$ received by a receiver and a second series of reference digital samples $p_n$ known to said receiver, in order to acquire synchronization of the system, and a set of coefficients $\hat{h}_n$ of an estimate of an impulse response of said transmission channel, when said system is already synchronized,
which detector further comprises means for calculating a decision variable A such that:

$$A = \frac{\sum_{n=0}^{L-1} |f_n|^2}{\frac{1}{N} \sum_{n=0}^{N-1} |x_n|^2}$$

where L and N are predetermined integers, said threshold detector supplying a synchronization looking indication.

6. Device for estimating an impulse response of a transmission channel, and for calculating a set of coefficients $\hat{h}_n$ of a channel estimate, comprising:
a threshold detector for a digital signal transmission system using a transmission channel, in particular for transmission to mobiles, said threshold detector comprising means for calculating a set of coefficients $f_n$ belonging to a group comprising a set of coefficients $c_n$ expressing a correlation between a first series of digital samples $x_n$ received by a receiver and a second series of reference digital samples $p_n$ known to said receiver, in order to acquire synchronization of the system, and a set of coefficients $\hat{h}_n$ of an estimate of the impulse response of said transmission channel, when said system is already synchronized, and means for calculating a decision variable A such that:

$$A = \frac{\sum_{n=0}^{L-1} |f_n|^2}{\frac{1}{N} \sum_{n=0}^{N-1} |x_n|^2}$$

where L and N are predetermined integers, which device further comprises means for correcting said set of coefficients $\hat{h}_n$ according to at least one threshold which is variable according to said decision variable.

7. Device for estimating a signal to noise ratio of a transmission channel, and for calculating a set of coefficients $\hat{h}_n$ of an estimate of the channel, comprising:

a threshold detector for a digital signal transmission system using a transmission channel, in particular for transmission to mobiles, said threshold detector comprising means for calculating a set of coefficients $f_n$ belonging to a group comprising a set of coefficients $c_n$ expressing a correlation between a first series of digital samples $x_n$ received by a receiver and a second series of reference digital samples $p_n$ known to said receiver, in order to acquire synchronization of the system, and a set of coefficients $\hat{h}_n$ of an estimate of an impulse response of said transmission channel, when said system is already synchronized, and means for calculating a decision variable A such that:

$$A = \frac{\sum_{n=0}^{L-1} |f_n|^2}{\frac{1}{N} \sum_{n=0}^{N-1} |x_n|^2}$$

where L and N are predetermined integers, which device further comprises means for calculating an estimate of said signal to noise ratio as:

$$\frac{\hat{S}}{N} \text{ (dB)} = 10 \log \frac{A}{1-A}.$$

8. Device for estimating a signal to noise ratio for any of the following applications:

equalizer activation control;

time division multiple access signal equalizer decision weighing;

code division multiple access signal despreading activation control;

signal transmit power control, of a device for estimating the signal to noise ratio of a transmission channel, and for calculating a set of coefficients $\hat{h}_n$ of an estimate of the channel, comprising:

a threshold detector for a digital signal transmission system using a transmission channel, in particular for transmission to mobiles, said threshold detector comprising means for calculating a set of coefficients $f_n$ belonging to a group comprising a set of coefficients $c_n$ expressing a correlation between a first series of digital samples $x_n$ received by a receiver and a second series of reference digital samples $p_n$ known to said receiver, in order to acquire synchronization of the system, and a set of coefficients $\hat{h}_n$ of an estimate of an impulse response of said transmission channel, when said system is already synchronized, and means for calculating a decision variable A such that:

$$A = \frac{\sum_{n=0}^{L-1} |f_n|^2}{\frac{1}{N} \sum_{n=0}^{N-1} |x_n|^2}$$

where L and N are predetermined integers,.

which device further comprises means for calculating an estimate of said signal to noise ratio as:

$$\frac{\hat{S}}{N} \text{ (dB)} = 10 \log \frac{A}{1-A}.$$

* * * * *